United States Patent
Shinozaki et al.

(10) Patent No.: US 8,349,420 B2
(45) Date of Patent: Jan. 8, 2013

(54) PACKING BODY SEALED BY LASER WELDING AND METHOD OF SEALING THE SAME

(75) Inventors: Kiyotaka Shinozaki, Yokohama (JP); Shoichi Inaba, Yokohama (JP); Yoshiaki Shinagawa, Yokohama (JP); Jiro Iida, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 127 days.

(21) Appl. No.: 13/003,939

(22) PCT Filed: Aug. 21, 2009

(86) PCT No.: PCT/JP2009/064615
§ 371 (c)(1),
(2), (4) Date: Jan. 13, 2011

(87) PCT Pub. No.: WO2010/024189
PCT Pub. Date: Mar. 4, 2010

(65) Prior Publication Data
US 2011/0117302 A1 May 19, 2011

(30) Foreign Application Priority Data
Aug. 29, 2008 (JP) .................................. 2008-221304

(51) Int. Cl.
*B29D 22/00* (2006.01)
(52) U.S. Cl. .................. 428/35.9; 428/36.91; 156/272.8
(58) Field of Classification Search ................. 428/35.9, 428/36.91, 349; 156/272.8
See application file for complete search history.

(56) References Cited

U.S. PATENT DOCUMENTS

| | | | | |
|---|---|---|---|---|
| 3,256,109 | A * | 6/1966 | Berger | 430/346 |
| 3,422,320 | A * | 1/1969 | Woodling | 257/710 |
| 3,597,237 | A * | 8/1971 | Nughes | 462/232 |
| 5,837,369 | A * | 11/1998 | Grunberger et al. | 428/349 |
| 6,949,153 | B2 * | 9/2005 | Gomez de Segura et al. | 149/109.6 |
| 6,964,717 | B2 * | 11/2005 | Grosser et al. | 156/69 |
| 8,197,630 | B2 * | 6/2012 | Basque et al. | 156/272.8 |
| 2005/0119377 | A1 | 6/2005 | Ishii et al. | |
| 2006/0093769 | A1* | 5/2006 | Biebuyck | 428/36.91 |
| 2007/0295445 | A1 | 12/2007 | Maatta et al. | |
| 2010/0055368 | A1* | 3/2010 | Sour et al. | 428/36.91 |
| 2011/0117302 | A1* | 5/2011 | Shinozaki et al. | 428/35.9 |
| 2011/0244208 | A1* | 10/2011 | Saka et al. | 428/220 |

FOREIGN PATENT DOCUMENTS

| | | |
|---|---|---|
| JP | 2000-128166 A | 5/2000 |
| JP | 2001-152985 A | 6/2001 |
| JP | 2005-187798 A | 7/2005 |

(Continued)

*Primary Examiner* — N. Edwards
(74) *Attorney, Agent, or Firm* — Sughrue Mion, PLLC

(57) ABSTRACT

A sealed packing body comprising a packing body made from a laminated material and a sealing member for sealing the packing body; wherein the laminated material includes a base material layer, a thermoplastic resin layer containing an iron powder, and a thermoplastic resin layer which permits a laser beam to pass through, at least the surface of the sealing member which comes in contact with the packing body comprising a thermoplastic resin which permits the laser beam to pass through; and the surfaces of the packing body and the sealing member coming in contact are sealed together by laser welding. It is, therefore, allowed to effectively utilize the iron powder that has, heretofore, been utilized as an oxygen absorber of the packing containers and to efficiently conduct the laser welding.

4 Claims, 1 Drawing Sheet

FOREIGN PATENT DOCUMENTS

| | | |
|---|---|---|
| JP | 2006-341869 A | 12/2006 |
| JP | 2007-523807 A | 8/2007 |
| JP | 2007-261667 A | 10/2007 |
| JP | 2008-050020 A | 3/2008 |

* cited by examiner

PACKING BODY SEALED BY LASER WELDING AND METHOD OF SEALING THE SAME

TECHNICAL FIELD

This invention relates to a packing body sealed by laser welding and a method of sealing the same. More specifically, the invention relates to a packing body sealed by welding by utilizing heat generated by an iron powder present in a laminated material constituting the packing body and to a method of sealing the same.

BACKGROUND ART

A method of sealing a container with a lid member is, usually, represented by a method of applying an adhesive onto the contacting surfaces of the container and the lid member to adhere them together, and a method of forming the contacting surfaces of the container and the lid member by using a heat-sealable resin and welding them together by heat-sealing.

Welding by heat-sealing is a simple method which has widely been employed requiring, however, extended periods of time for the step of welding and for the subsequent step of cooling, and it has been desired to improve the production efficiency.

According to a general heat-sealing system that uses a heat-sealing bar, a welding portion requires an area of a certain degree and, besides, the welding surface must be flat. Further, since heat must be conducted to the sealing surface from the outer surface of the welding portion, an extended period of time is required for conducting heat in the case of a thick container accompanied, therefore, by such problems as low productivity, limited thickness and low degree of freedom in the shape.

Further, since a predetermined period of time is required before the heat-sealing portion is cooled and is completely sealed, it is probable that the sealing peels off particularly when a content that spontaneously produces pressure is filled or when a content is filled while it is hot, since a gas that is expanded due to the heat of sealing in the head space may escape through the sealing portion in a molten state.

As for a method of welding the container and the lid member, on the other hand, there has heretofore been known the welding by using laser. For example, the following patent document 1 proposes welding a bottom lid and an upper lid to the container body in an integral form by laser welding. When the member of the packing body is welded by laser, the welding is readily attained after having been irradiated with a laser beam as compared to the case of heat-sealing. Therefore, a shortened period of time is required for the welding which can be reliably attained without limitation on the shape thereof.

Generally, the portion to be welded by laser must include a portion that generates heat upon absorbing a laser beam. So far, therefore, it has been proposed to color the portion to be irradiated with laser by using a black pigment such as carbon black or an organic pigment (patent documents 2, 3).

PRIOR ART DOCUMENTS

Patent Documents

Patent document 1: JP-A-2000-128166
Patent document 2: JP-A-2001-152985
Patent document 3: JP-A-2005-187798

OUTLINE OF THE INVENTION

Problems that the Invention is to Solve

When colored with a pigment such as carbon black, the material can be welded arousing, however, such problems as generating odor due to heating or causing carbonization. When the content is a food or the like, in particular, odor that is adsorbed by the content spoils its flavor. Therefore, the pigment of this kind cannot be used.

Further, the additives of this kind face limitation when they are to be used for foods from the hygienic point of view.

It is, therefore, an object of the present invention to provide a sealed packing body that can be used for the food applications and can be effectively welded with laser without arousing the above-mentioned problems, and a method of sealing the same.

Another object of the present invention is to provide a sealed packing body which can be effectively welded with laser by efficiently utilizing an iron powder that has heretofore been utilized as an oxygen absorber for the packing containers, and a method of sealing the same.

Means for Solving the Problems

According to the present invention, there is provided a sealed packing body comprising a packing body made from a laminated material and a sealing member for sealing the packing body, wherein:

the laminated material includes a base material layer, a thermoplastic resin layer containing an iron powder, and a thermoplastic resin layer which permits a laser beam to pass through, at least the surface of the sealing member which comes in contact with the packing body comprising a thermoplastic resin which permits the laser beam to pass through; and the surfaces of the packing body and the sealing member coming in contact are sealed together by laser welding.

According to the sealed packing body of the invention, it is desired that the iron powder is used as an oxygen absorber.

According to the present invention, there is further provided a method of sealing a packing body made from a laminated material and a sealing member for sealing the packing body, the laminated material including a base material layer, a thermoplastic resin layer containing an iron powder, and a thermoplastic resin layer which permits a laser beam to pass through, at least the surface of the sealing member which comes in contact with the packing body comprising a thermoplastic resin which permits the laser beam to pass through; wherein the sealing method comprises applying a laser beam from the side of the sealing member to heat the thermoplastic resin layer containing the iron powder so as to melt the thermoplastic resin layer which permits the laser beam to pass through to thereby weld the contacting surfaces of the packing body and the member together.

According to the sealing method of the invention, it is desired to press the contacting surfaces of the packing body and the member with a rigid material which permits the laser beam to pass through at the time of applying the laser beam.

Effects of the Invention

The sealed packing body of the invention uses neither the carbon black nor the organic pigment that were so far used for generating heat by absorbing laser beam. Besides, the layer that contains the iron powder is formed as an intermediate layer. Therefore, the heat-generating agent (iron powder) is not directly exposed on the welding surface decreasing the generation of odor, making it possible to further decrease the effect of odor, and eliminating the problem of split off of extracted components and iron powder. Therefore, the sealed packing body can be favorably used for foods.

Further, the method of sealing the packing body of the invention requires no cooling step that was so far required for the welding by heat-sealing by using a heated plate. Therefore, the method of the invention helps improve the productivity enabling even a relatively thick member to be efficiently sealed at a high speed maintaining stability and at a decreased cost.

Moreover, there is no limitation on the shape of the welded portion, and the invention can be applied to the sealed packing bodies of a variety of forms.

BEST MODE FOR CARRYING OUT THE INVENTION

According to a sealed packing body obtained by welding a packing body and a sealing member together of the present invention, a laminated material that constitutes the packing body includes a base material layer, a thermoplastic resin layer containing an iron powder (hereinafter often referred to as "iron powder-containing layer"), and a thermoplastic resin layer which permits a laser beam to pass through (hereinafter often referred to as "transmission layer"). On the other hand, the sealing member for sealing the packing body is the one of which at least the surface that comes in contact with the packing body is made from a thermoplastic resin which permits the laser beam to pass through enabling the contacting surfaces of the packing body and the sealing member to be effectively welded together.

That is, the contacting surfaces of the packing body and the sealing member have been made from the thermoplastic resin which permits the laser beam to pass through. Therefore, the laser beam that is applied passes through these layers and arrives at the thermoplastic resin layer containing the iron powder in the laminated material that constitutes the packing body causing the iron powder to generate heat. Due to this heat, the thermoplastic resin which is in contact with the sealing member and which permits the laser beam to pass through undergoes the melting; i.e., sealing by welding is attained on the surface that comes in contact with the sealing member.

(Laminated Material)

Figure 1:
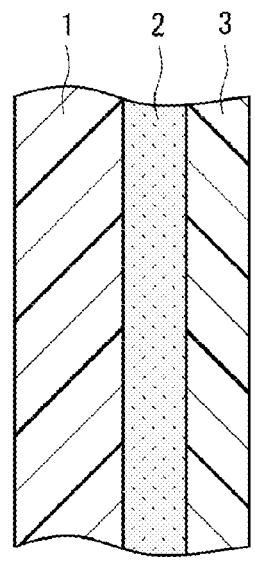
FIG. 1 is a sectional view illustrating the layer constitution of a laminated material used in the invention.

In the invention, the laminated member that constitutes the packing body includes, as shown in FIG. 1, a base material layer 1, a thermoplastic resin layer 2 containing an iron powder, and a thermoplastic resin layer 3 which permits a laser beam to pass through.

There can be used various base material layers depending upon the form of the packing body. Namely, there can be used a single layer of a thermoplastic resin, e.g., olefin resin such as polyethylene, polypropylene or ethylene/vinyl alcohol copolymer, polyester resin such as polyethylene terephthalate, or polyamide resin such as nylon 6 or nylon 6,6. Or, the single layers may be used in combination to form a laminate thereof. Or, the above thermoplastic resin may be laminated on a paper, wood, metal foil such as aluminum foil, or on an inorganic film or a metal-deposited film to form a laminate thereof.

Though not limited thereto only, there can be preferably used a laminate comprising a polyester, an aluminum foil, a nylon and a polyolefin in this order from the outer side.

In the case of a laminate, it is desired that the layer on the side that comes in contact with the iron powder-containing layer comprises the same resin as the thermoplastic resin that constitutes the iron powder-containing layer.

As the thermoplastic resin that constitutes the iron powder-containing layer, there can be used the same resin as the thermoplastic resin exemplified concerning the base material layer. Preferably, there can be preferably used olefin-type resins such as low-, intermediate- or high-density polyethylene, linear low-density polyethylene, isotactic polypropylene, propylene/ethylene copolymer, polybutene-1, ethylene/propylene copolymer, ethylene/butene-1 copolymer, propylene/butene-1 copolymer, ethylene/propylene/butene-1 copolymer, ethylene/vinyl acetate copolymer, ionically crosslinked olefin copolymer (ionomer), and ethylene/vinyl alcohol copolymer which is a saponified product having a saponification degree of not less than 50 mol % and, particularly, not less than 60 mol % obtained by saponifying the ethylene/vinyl acetate copolymer.

It is, further, desired that the thermoplastic resin that constitutes the iron powder-containing layer is a resin having a melting point higher than, or equal to, that of the thermoplastic resin that constitutes the transmission layer that will be described later. Upon the generation of heat by the iron powder, therefore, the transmission layer melts and effectively welds to the sealing member. If the resin has a low melting point, the iron powder-containing layer melts much and does not efficiently weld to the transmission layer.

Any iron powder can be preferably used in the iron powder-containing layer provided it is the one that has heretofore been used as an oxygen absorber in the field of the packing containers. Further, though not limited thereto only, the iron powder may be the one chiefly comprising any one of ferrous oxide, tri-ion tetroxide, reducing metal compound such as iron carbide, ferrosilicon, iron carbonyl or ferrous hydroxide or a combination thereof. As required, they may be used in combination with an assistant such as hydroxide, carbonate, sulfite, thiosulfate, tertiary phosphate, organic acid salt and halide of alkali metal or alkaline earth metal, as well as active carbon, active alumina and active clay.

The iron powder that can be preferably used, usually, has an average particle size in a range of 10 to 50 µm and, particularly, 15 to 25 µm. The particle size can be measured by using, for example, a laser diffraction particle size distribution-measuring instrument.

It is desired that the iron powder is contained in the iron powder-containing layer in an amount in a range of 5 to 40% by weight and, particularly, 10 to 30% by weight. If the content of the iron powder is smaller than the above range, heat is not generated to a degree to weld the thermoplastic resin of the transmission layer by absorbing the laser beam. If the content of the iron powder is larger than the above range, on the other hand, moldability is deteriorated, heat is generated in too large amounts, and the resin of the iron powder-containing layer may be decomposed and carbonized.

The transmission layer comprises a thermoplastic resin which permits the laser beam to pass through and can be welded by heat generated by the iron powder. It is desired that the thermoplastic resin has a laser transmission factor of not smaller than 70% and, particularly, not smaller than 80%. The laser transmission factor is found by measuring the transmission factor of light corresponding to the wavelength of the laser beam by using a spectrophotometer.

The laser transmission factor varies depending upon the thickness of the layer despite the same thermoplastic resin is used. In the present invention, the transmission factor of not smaller than 70% stands for the one obtained in a range of thickness of the transmission layer that will be described later.

As the thermoplastic resin, there can be exemplified the same thermoplastic resins as those exemplified concerning the iron powder-containing layer. Preferably, there can be used olefin-type resins, such as low-, intermediate- or high-density polyethylene, isotactic polypropylene, propylene/ethylene copolymer, polybutene-1, ethylene/propylene copolymer, ethylene/butene-1 copolymer, propylene/butene-1 copolymer and ethylene/propylene/butene-1 copolymer. It is particularly desired to use a thermoplastic resin having a melting point of not higher than 160° C. for easily attaining welding.

The transmission layer has a thickness which, preferably, is in a range of 5 to 500 µm and, particularly, 20 to 100 µm. If the thickness of the transmission layer is smaller than the above range, the welding cannot be reliably attained. If the thickness of the transmission layer is larger than the above range, on the other hand, it becomes difficult for the laser beam to arrive at the iron powder-containing layer under ordinary conditions, and the welding cannot be reliably attained, either.

Thicknesses of the layers of the laminated material can be suitably set depending upon the form of the packing body, base material that is used and the applications, except the thickness of the transmission layer and, therefore, cannot be definitely specified. Generally, however, it is desired that the base material has a thickness in a range of 50 to 1000 µm and, particularly, 70 to 800 µm, and the iron powder-containing layer has a thickness in a range of 10 to 400 µm and, particularly, 25 to 300 µm.

The laminated material can be produced by a known method such as co-extrusion method, heat-adhesion method or dry lamination method by using an adhesive.

(Sealing Member)

The sealing member used in the invention comprises a thermoplastic resin of which at least the surface that comes in contact with the packing body permits the laser beam to pass through.

As such a thermoplastic resin, there can be used the thermoplastic resin used for the above-mentioned transmission layer and having a single-layer structure of the above thermoplastic resin, a multi-layer structure of a plurality of kinds of thermoplastic resins, or a multi-layer structure further forming an inorganic vapor-deposited layer for imparting gas-barrier property to the sealing member. In this case, it is desired that the layer that comes in contact with the transmission layer of the packing body is made from the thermoplastic resin of the same kind as the thermoplastic resin used for the transmission layer.

Further, the sealing member may, at least, have a portion that comes in contact with the packing body permitting the laser beam to pass through and may have other portions on where, for example, a colored resin layer or a printed layer is formed without permitting the laser beam to pass through.

The sealing member has a thickness in a range of, desirably, 5 to 2000 µm and, particularly, 20 to 800 µm on at least a portion thereof that comes in contact with the packing body, and has a total thickness together with the transmission layer in a range of 10 to 2500µ and, particularly, 40 to 900 µm for enabling the laser beam to reliably reach the iron powder-containing layer of the packing body.

(Sealed Packing Body)

The sealed packing body of the invention is obtained by sealing the above packing body and the sealing member relying on a laser welding and, therefore, can be welded without limited by the shape of the packing body or the sealing member, and can be realized in a variety of forms.

The packing body is so formed that the transmission layer is positioned on a surface that comes in contact with the sealing member.

Concretely, the packing body may be a container such as a cup or a tray made from a film-like or sheet-like laminated material by heat-molding such as vacuum molding, compressed air molding or plug-assisted molding, or a container such as a cup with bottom obtained by draw-molding. In this case, the sealing member constitutes a lid. When the packing body is a cup having a flange portion, the packing body (cup or the like) and the sealing member (lid member) come in contact along the flange portion so as to be welded together.

The lid may assume a variety of shapes depending upon the shape of the cup or the tray, such as a flat shape, dented shape with the central portion being dented inward, an over-cap shape having a skirt portion hanging down from the outer circumferential end portion of the top panel portion. Namely, the shape of the lid can be suitably varied to meet a portion that comes in contact with the packing body.

When the packing body is a container like a milk pack obtained by assembling a laminated material, a pouch, or a container for transporting liquid, the sealing member can assume the form of a pouring fitting. Though there is no limitation, the pouring fitting may, for example, comprise a main body having a pouring port that is fixed to the container by welding and a lid portion that seals the pouring port. In this case, the welding portion of the body of the pouring fitting may permit the laser beam to pass through.

Further, a pouch may be formed by both the packing body and the sealing member. For example, the side surface of a standing pouch is constituted by the laminated material, and the bottom portion is constituted by the sealing member.

(Sealing Method)

In the present invention, the portion where the sealing member comes in contact with the packing body made from the above laminated material is irradiated with the laser beam from the side of the sealing member so that the iron powder-containing layer generates heat to melt the transmission layer, causing the contacting surfaces of the packing body and the sealing member to be welded together.

In the sealing method of the present invention, it is important to bring the surfaces of the packing body and the sealing member into close contact with each other at the time of irradiation with the laser beam to efficiently weld the two together. As described earlier, it is desired to press the contacting surfaces of the packing body and the sealing member by using a rigid material that permits the laser beam to pass through in order to attain close adhesion.

If the contacting surfaces of the packing body and the sealing member are not flat, they can be closely adhered to each other by using a jig that pushes and fixes the two together, or can be closely adhered to each other by molding the packing body and the sealing member in such sizes and shapes that the packing body and the sealing member attain such a positional relationship as to push each other on the contacting surfaces.

Figure 2:
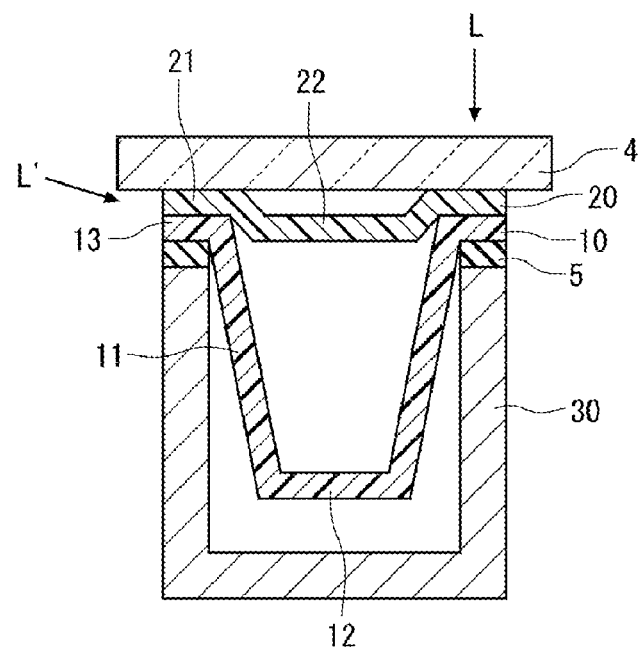
FIG. 2 is view illustrating a sealing method of the invention.

FIG. 2 is a view illustrating a method of sealing the sealed packing body comprising a packing body which is a cup 10 that includes a body portion 11, a bottom portion 12 and a flange portion 13, and a sealing member which is a molded lid 20 of the shape of a lid that is dented inward at a central portion 22 on the inside of a circumferential edge portion 21 corresponding to the flange portion of the packing body.

The cup 10 is set in a receiving plate 30 of aluminum and is supported at the flange portion 13. The molded lid 20 is so set that the circumferential edge portion 21 of the molded lid 20 is located at the position of the flange portion 13 of the cup 10. A flat rigid material 4 such as a glass plate is placed on the molded lid 20 to closely adhere the contacting surfaces of the flange portion 13 of the cup 10 and the circumferential edge portion 21 of the molded lid 20. In the concrete embodiment that is shown, an elastic member 5 made from a silicone rubber or the like is formed on the receiving plate and holds the flange portion 13 of the cup 10 and the circumferential edge portion 21 of the molded lid 20 together with the rigid material 4 to improve close adhesion between the two.

Next, the laser beam is applied from the upper side to seal the contacting surfaces of the cup and the molded lid by welding. Here, a uniform, strong and air-tight welding is attained by simply applying the laser beam while rotating either the cup or the laser beam.

When the laser beam is applied from just over the lid as indicated by L in the drawing, the molded lid 20 must be made from a resin that permits the laser beam to pass through at least at the portion to be irradiated with the laser beam. It is, further, allowable to apply the laser beam aslant or from a transverse direction as indicated by L' in the drawing to effect the welding. In this case, the molded lid 20 may be made from the resin that permits the laser beam to pass through at the portion that comes in contact with the flange portion 13 of the cup 10. Therefore, a printed layer or any other layer opaque to the laser beam may be formed on the upper side of the molded lid.

The laser beam used in the invention may be that of a gas laser, a solid laser or a semiconductor laser. Among them, the semiconductor laser can be preferably used.

The laser oscillator has an output in a range of, preferably, 20 to 150 W and, particularly, 30 to 100 W. Further, the laser beam has a wavelength in a range of, preferably, 200 nm to 20 and, particularly, 400 nm to 15 μm. In a commercial sense, they are determined depending upon the transmission property of the resin, property of the substance that generates heat upon absorbing laser beam, and output, cost and safety of the laser oscillator.

In the present invention, the laser beam has a spot diameter in a range of, preferably, 0.2 to 3 mm and, particularly, 0.5 to 2 mm from the standpoint of sealing of the packing body.

Further, the focal distance of the laser beam is in a range of, preferably, 10 to 200 mm and, particularly, 50 to 150 mm, i.e., in a range of 30 to 70 mm+thickness of the layer that permits the laser beam to pass through from the standpoint of preventing the resin from being deteriorated yet maintaining sealing by welding.

Further, the sweeping speed of the laser beam is in a range of 50 to 300 mm/sec. and, particularly, 100 to 200 mm/sec. from the standpoint of preventing the resin from being deteriorated yet maintaining sealing by welding.

Further, the welding can be conducted under various conditions provided heat can be generated in such an amount that the welding portion is heated to be higher than its melting point. If it is desired to shorten the welding time, the laser output may be increased and the rotational speed may be increased. If it is not allowed to use the laser of a high output, the welding portion may be irradiated for an extended period of time. In the case of the container, the rotational speed of the container may be decreased. Further, if the laser output is large enough for attaining the melting, then the diameter of the laser beam may be increased to increase the width of welding.

EXAMPLES

Example 1

(1) Two pieces of laminated films (A) and (B) having the laminate constitutions as described below were prepared by the dry-lamination and the extrusion-lamination.

The laminated films (A) and (B) were contacted to each other on their inner surface sides (polypropylene layers) and were closely adhered to each other being sandwiched by a glass plate (having a thickness of 10 mm and a light transmission factor of 98% for light of a wavelength of 807 nm) and an aluminum plate with a silicone rubber (a rubber thickness of 1 mm and an aluminum thickness of 10 mm).

The transparent film (A) was placed on the side of the glass plate, and the laser beam was applied from the side of the glass plate. The laser beam that has passed through the glass plate and the film (A) was absorbed by the iron powder-containing PP, converted into heat energy, caused the PP on the inner surface sides to weld and the two pieces of films to weld together.

[Film (A)]

Possessed a layer constitution of a silica-deposited polyester (12 μm thick, deposition was on the inner surface side)/a silica-deposited polyester (12 μm thick, deposition was on the inner surface side)/a nylon (15 μm thick)/a polypropylene (50 μm thick, light transmission factor of 86% for light of a wavelength of 807 nm) in this order from the outer surface side, and possessed, as a laminated film, a light transmission factor of 75% for light of a wavelength of 807 nm.

[Film B]

Possessed a layer constitution of a polyester (12 μm thick)/an aluminum foil (7 μm thick)/a nylon (15 μm thick)/a polypropylene (30 μm thick)/an iron powder-containing polypropylene (25 μm thick, melting point of 160° C., iron powder content of 20% by weight)/a polypropylene (30 μm thick, a melting point of 160° C., a light transmission factor of 93% for light of a wavelength of 807 nm).

(2) Conditions for the laser welding were as follows:

Laser oscillator:
 Manufactured by Jenoptik Co.
 Semiconductor (GaAs) laser
 Wavelength, 807±3 nm
 Maximum output, 140 W
Laser irradiation conditions:
 Output, 50 W
 Spot diameter, 1 mm
 Linear velocity of irradiation, 236 mm/sec.
Closely adhering condition:
 0.2 kg/cm$^2$ (pressure for close adhesion of when two pieces of films were sandwiched by the glass plate and the aluminum plate with silicone rubber).

(3) Results:

The inner surface members were firmly welded together to maintain sealing performance.

As a rough indication of welding, the strength of the welded portion was evaluated as a heat-sealed strength in compliance with the JIS Z0238. The results were all not smaller than 30 N/15 mm, and the strengths were all large enough.

There was no smell of scorching that may be produced at the time of welding, and the welded surfaces were not scorched, either.

Comparative Example 1

(1) Example 1 was repeated but using a laminated film (C) comprising a polyester (12 μm thick)/an aluminum foil (7 μm thick)/a nylon (15 μm thick)/a polypropylene (25 μm thick)/a carbon black-containing polypropylene (30 μm thick, a melting point of 160° C., a carbon black content of 2%) in this order from the outer side instead of using the laminated film (B), followed by irradiation with the laser beam in the same manner as in Example 1 to weld the inner surfaces of the films (A) and (C) together.
(2) Results:
The PP on the inner surface sides could be welded together, but the smell of scorching was conspicuous.
Besides, the welded portion was partly scorched.

Example 2

(1) A cup container was molded from a resin sheet of the following laminate constitution by a vacuum-molding method. Resin sheet (numerals represent thicknesses of the layers):
(Outer surface side) 680 μm polypropylene/30 μm adhesive layer/90 μm EVOH/30 μm adhesive layer/200 μm iron powder-containing polypropylene/470 μm polypropylene (inner surface side)

Here, a symbol EVOH represents an ethylene/vinyl alcohol copolymer resin, the iron powder-containing polypropylene possessed a melting point of 160° C., the content of iron powder was 27% by weight, the polypropylene forming the inner surface layer possessed a melting point of 160° C., the wavelength was 807 nm, and the light transmission factor was 78%.

The cup was of such a shape that the outer diameter of mouth was 75 mm, the content was 215 ml, and a flange portion was formed along the opening portion. The lid was obtained by injection-molding a polypropylene resin (melting point of 160° C.) and possessed the outer diameter of mouth of 75 mm. The molded lid had a thickness of about 0.8 mm. Further, the wavelength was 807 nm and the light transmission factor was 85%.

Referring to FIG. 2, the cup was introduced into the receiving plate of aluminum, and the molded lid was placed on the cup.

The molded lid was held by a glass plate, and a laser beam was applied from the side of the glass plate to weld the cup and the molded lid together. The silicone rubber was stuck to the aluminum receiving plate.
(2) Conditions for the laser welding were as follows:
Laser oscillator:
  Manufactured by Jenoptic Co.
  Semiconductor (GaAs) laser
  Wavelength, 807±3 nm
  Maximum output, 140 W
Laser irradiation conditions:
  Output, 50 W
  Spot diameter, 1 mm
  Irradiation time, 4 seconds (linear velocity of irradiation, 118 mm/sec.)
The receiving plate was turned at a rate of 0.5 turns a second, and the irradiation was continued for two turns.
Closely adhering condition:
  1 kg/cm$^2$ (pressure of when held by the glass plate).
(3) Results:
The PP on the inner surface side of the cup and the molded lid were welded together to maintain sealing performance.

As a rough indication of welding, the strength of the welded portion was evaluated as a heat-sealed strength in compliance with the JIS Z0238. The results were all not smaller than 30 N/15 mm, and the strengths were all large enough.

Comparative Example 2

(1) The cup and the molded lid of Example 2 were welded together by the ordinary heat-sealing by using the hot plate instead of the laser welding, i.e., by pressing the molded lid by using the hot plate instead of using the glass plate of FIG. 2. Here, to prevent the molded lid from welding to the hot plate, the heat-sealing was conducted by placing a sheet of a polytetrafluoroethylene in between.
(2) Heat-sealing conditions:
  Temperatures: 190° C. and 210° C.
  Time: 3.0 seconds
  Pressure: 1 kg/cm$^2$
(3) Results:
Welding could not be attained at a temperature of 190° C. At a temperature of 210° C., the molded lid was welded and the welded portion was pierced. The heat-sealing was not practicable since the conditions were too narrow for welding the molded lid.

INDUSTRIAL APPLICABILITY

The sealed packing body of the invention uses none of the carbon black and the organic pigment that have heretofore been used for generating heat by absorbing the laser beam, but has the layer containing an iron powder as an intermediate layer. This lowers the generation of odor caused by welding, and is not accompanied by such problems as split off of extracted components and iron powder, offering excellent flavor-retaining property and lending the packing body favorably suited for containing foods.

According to the method of sealing the packing body of the invention, further, there is required no such cooling step as that of the welding by heat-sealing by using the hot plate employed by the prior art, enabling the productivity to be improved. Further, even a relatively thick member can be efficiently sealed at a high speed maintaining stability and at a low cost. Besides, since there is no limitation on the shape of the welding portion, the invention can be applied to the sealed packing bodies of a variety of forms.

DESCRIPTION OF REFERENCE NUMERALS

1—base material layer
2—thermoplastic resin layer containing iron powder
3—thermoplastic resin layer which permits a laser beam to pass through
10—cup 11—body portion 12—bottom portion
13—flange portion 20—molded lid
21—circumferential edge portion
22—central portion 30—receiving plate

The invention claimed is:
1. A sealed packing body comprising a packing body made from a laminated material and a sealing member for sealing said packing body; wherein
the laminated material includes a base material layer, a thermoplastic resin layer containing an iron powder, and a thermoplastic resin layer which permits a laser beam to pass through, at least the surface of said sealing member which comes in contact with the packing body comprising a thermoplastic resin which permits the laser beam to pass through; and the surfaces of said packing body and the sealing member coming in contact are sealed together by laser welding.

2. The sealed packing body according to claim 1, wherein said iron powder is used as an oxygen absorber.

3. A method of sealing a packing body made from a laminated material and a sealing member for sealing said packing body, said laminated material including a base material layer, a thermoplastic resin layer containing an iron powder, and a thermoplastic resin layer which permits a laser beam to pass through, at least the surface of said sealing member which comes in contact with the packing body comprising a thermoplastic resin which permits the laser beam to pass through; wherein the sealing method comprises applying a laser beam from the side of said sealing member to heat the thermoplastic resin layer containing the iron powder so as to melt the thermoplastic resin layer which permits the laser beam to pass through to thereby weld the contacting surfaces of the packing body and the member together.

4. The sealing method according to claim 3, wherein in applying the laser beam, the contacting surfaces of the packing body and the sealing member are pressed with a rigid material which permits the laser beam to pass through.

* * * * *